United States Patent [19]

Sowards

[11] 4,226,335
[45] Oct. 7, 1980

[54] DEVICE FOR DISPENSING FISH EGGS

[76] Inventor: Edward W. Sowards, 160 Ridge Rd., Ben Lomond, Calif. 95005

[21] Appl. No.: 937,857

[22] Filed: Aug. 29, 1978

[51] Int. Cl.³ .............................................. B65D 85/30
[52] U.S. Cl. ................................. 221/185; 221/266; 43/55
[58] Field of Search ............... 221/191, 192, 185, 255, 221/256, 266; 43/55

[56] References Cited

U.S. PATENT DOCUMENTS

| 1,065,472 | 6/1913 | Ross | 221/266 |
| 2,702,960 | 3/1955 | Weaver | 43/55 X |
| 2,787,080 | 4/1957 | Wells | 43/55 |
| 3,091,364 | 5/1963 | Ayres | 221/256 |
| 3,189,221 | 6/1965 | LaChance | 221/266 X |

FOREIGN PATENT DOCUMENTS 544371 6/1956 Italy ......................................... 221/256

Primary Examiner—Joseph J. Rolla
Attorney, Agent, or Firm—Clarence A. O'Brien; Harvey B. Jacobson

[57] ABSTRACT

A device is disclosed for convenient dispensing of fish eggs for use as bait in sport fishing. The device offers convenience in individual dispensing of eggs in an outdoor environment as well as protection for the eggs in retaining oils necessary to keep the eggs fresh and untouched by human hands as an individual egg is raised into position for insertion of a fishing hook.

12 Claims, 10 Drawing Figures

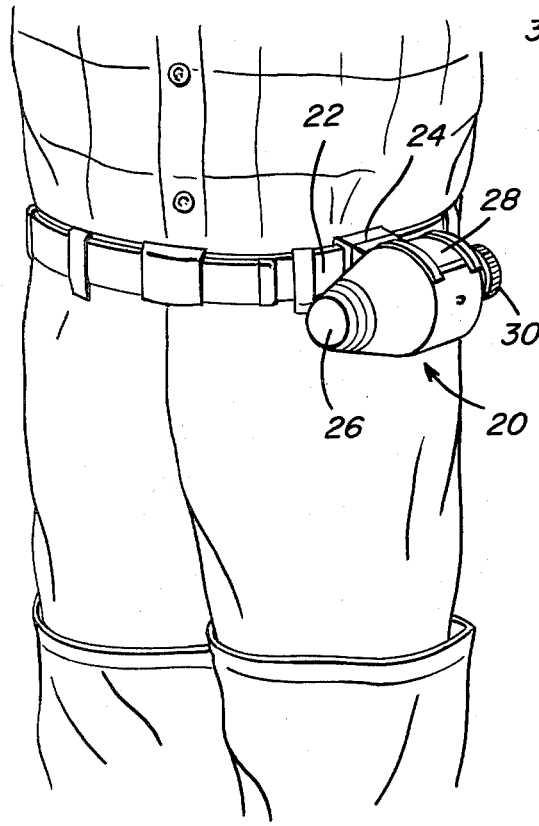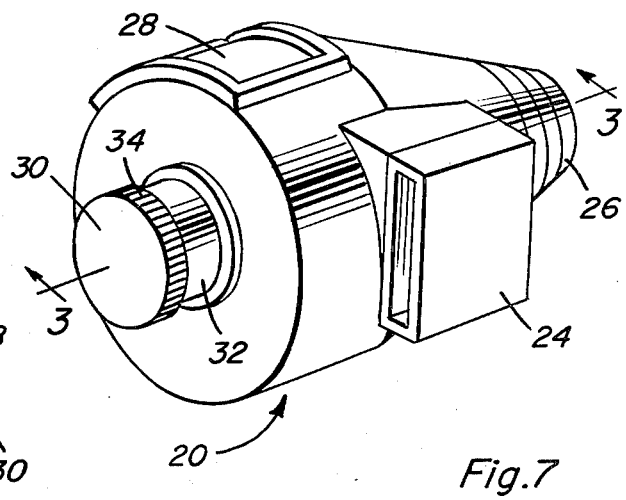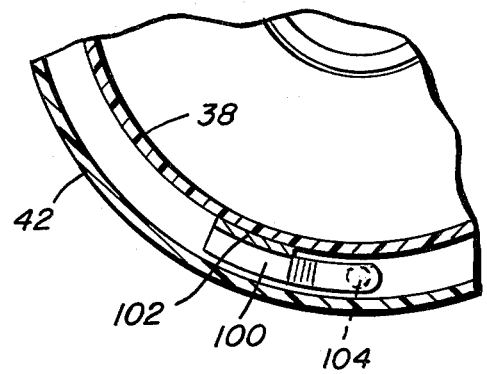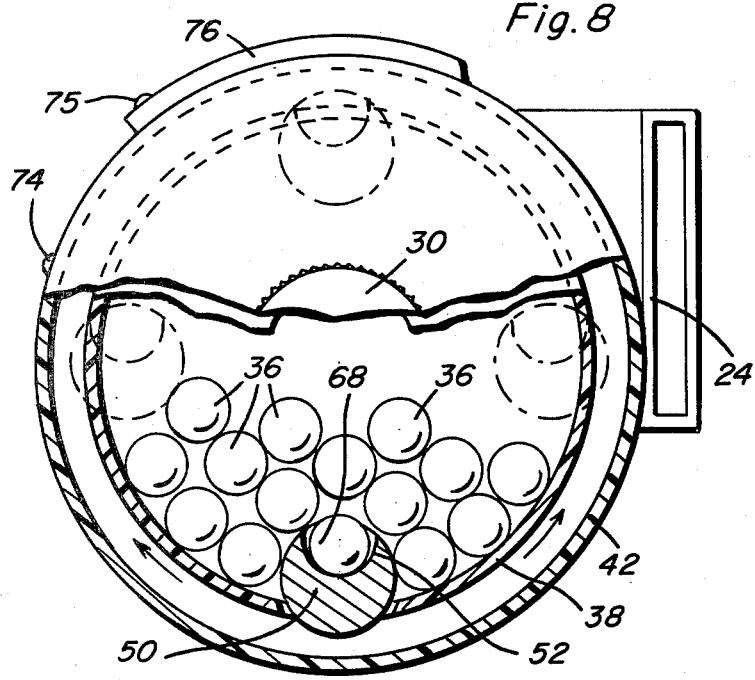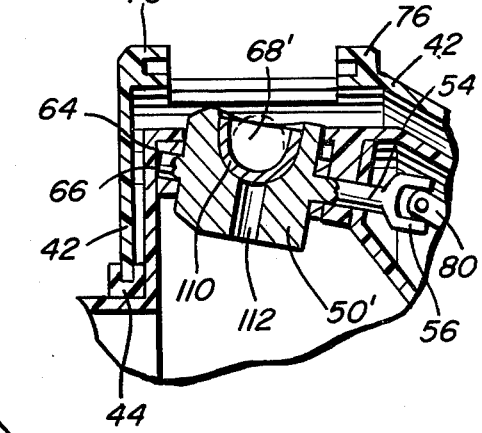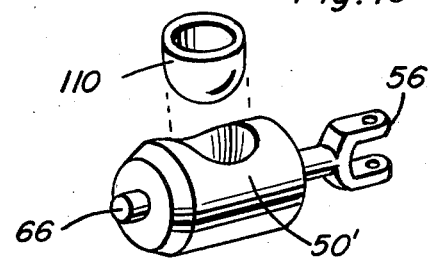

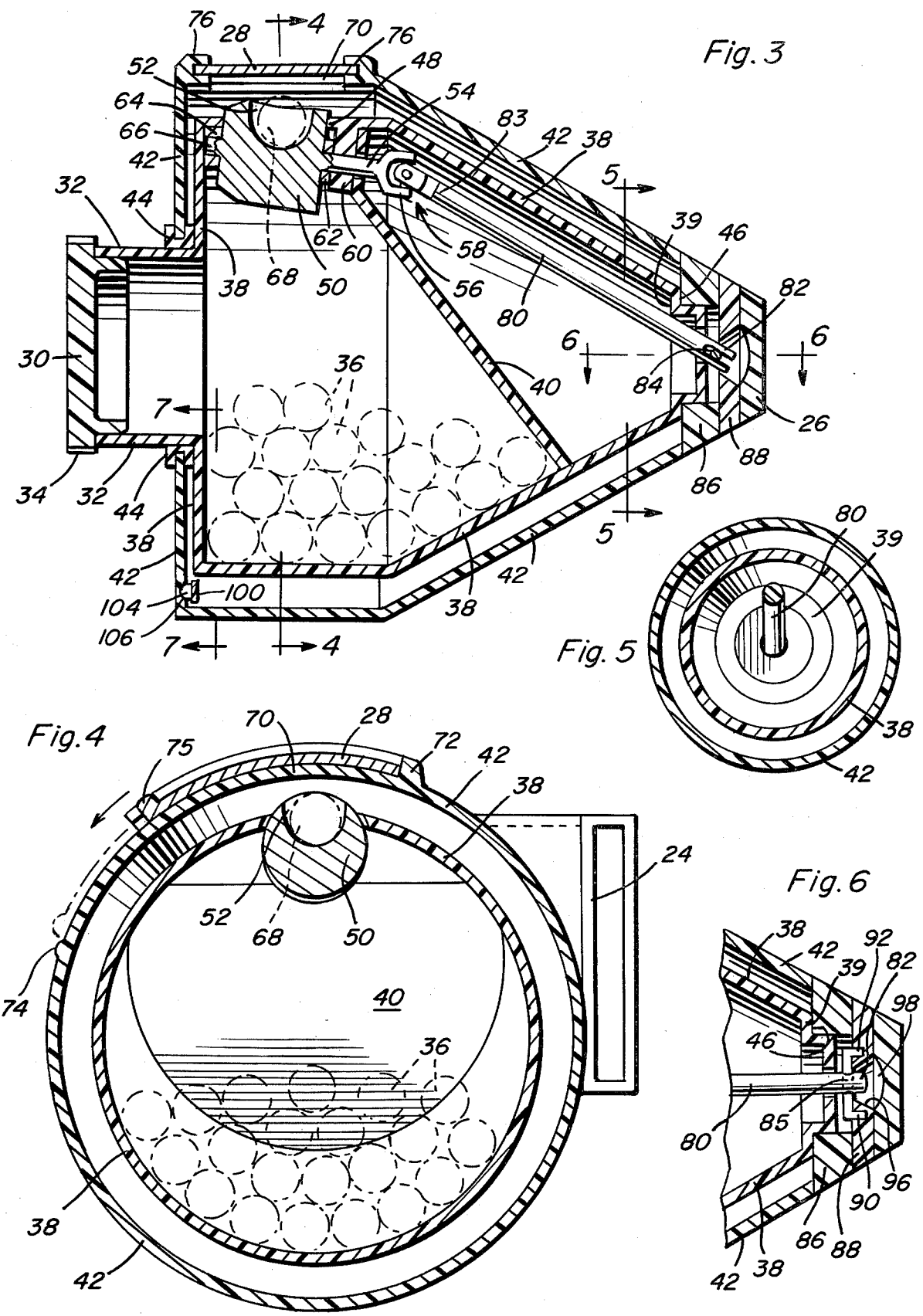

DEVICE FOR DISPENSING FISH EGGS

BACKGROUND OF THE INVENTION

Devices for dispensing of fish eggs individually under field conditions are known. For example, Weaver in U.S. Pat. No. 2,702,960, issued Mar. 1, 1955, provides a receptacle for salmon eggs embodying a stationary member and receptacle slidably held therein. Longitudinal sliding exposes an opening with access to the eggs contained inside the receptacle for dispensing. Johnston in U.S. Pat. No. 2,443,861, issued June 22, 1948, fills a tube with a row of eggs, the tube end having a gate device for discharge of salmon eggs one at a time when needed. Use of both of these devices requires manual manipulation of the fishing hook and the device which detracts from the convenience, accessibility, and ease of operation of a dispenser opening upwardly with access to a single egg.

Devices employing concentrically oriented rotatable receptacle chambers for storage and dispensing of articles are also known. Ross in U.S. Pat. No. 1,065,472, issued June 24, 1913, shows a delivery cabinet for cigarettes or other cylindrical articles, and Moore uses a related, somewhat different construction for storage and dispensing of articles of the same shape in U.S. Pat. No. 1,703,352, issued Feb. 26, 1929. LaChance in U.S. Pat. No. 3,189,221, issued June 15, 1965, shows a dispenser for small spherical articles by rotation of a dispensing wheel in which pockets lift and discharge the article into a channel where it rolls into a central receiving cup. Besides the unsuitability of the LaChance device for dispensing an article which must be preserved in a liquid environment, it is necessary to sweep out the articles with a shearing action to shake up the articles to insure feeding. Such treatment of delicate articles such as fish eggs constitutes a drawback which renders devices such as the LaChance dispenser completely unsuitable for dispensing the articles intended by the present invention.

Other patents showing fishing equipment including containers and dispensers for fishermen's bait include the following:

| | | |
|---|---|---|
| 503,722 | Lewis et al. | June 15, 1893 |
| 2,503,490 | Janz | April 11, 1950 |
| 2,573,202 | Kent | Oct. 30, 1951 |
| 3,964,204 | McKinley | June 22, 1976 |

SUMMARY OF THE INVENTION

The invention provides for dispensing of fragile substantially spherical objects, such as fish eggs used for bait during sport fishing, in a manner which protects the eggs from damage during storage and permits their convenient dispensing individually as needed. Fish eggs, particularly salmon eggs, are commonly used for sport fishing, and with the present invention are stored in an inside container rotatable within an outside protective case, which can be conveniently affixed to a fisherman's belt for immediate and convenient access as eggs are needed for use as fishing bait. A cup for dipping into the supply of eggs stored in the inside container has an upright recess sized to hold a single egg. The inside container can be rotated by the fisherman along with the cup, which remains in upright position as it travels through the supply of fish eggs near the bottom of the inside container, thence upwardly around the periphery of the inside container for presentation through a sliding door in the upper portion of the outside protective case. Eggs when used for the purpose intended must be stored in contact with a liquid medium.

Accordingly, it is an object of the present invention to provide a device for individual dispensing of fish eggs for use as fishing bait.

Another object of the invention is to provide for easy resupply of the device containing the eggs.

Still another object is to allow protection of the supply of eggs during use in sport fishing, including maintenance of a proper liquid environment for the supply of fish eggs and dispensing of eggs untouched by human hands.

Yet another object is to provide indicating means for alerting the user of the device when an egg is positioned for removal.

Still a further object of the invention is to provide a device easily mounted upon a fisherman's belt for convenient access during sport fishing.

Still a further object of the invention is to permit adaptability for withdrawing eggs of approximately uniform size selected from one of a plurality of sizes.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of the device of the present invention attached to the belt of a person engaged in sport fishing.

FIG. 2 is an enlarged perspective view of the device in the opposite direction.

FIG. 3 is a longitudinal sectional view of the device of FIG. 2, taken substantially upon a plane passing along section line 3—3 on FIG. 2.

FIG. 4 is a transverse sectional view of the device taken substantially upon a plane passing along section line 4—4 on FIG. 3.

FIG. 5 is a transverse sectional view taken substantially upon a plane passing along section line 5—5 on FIG. 3.

FIG. 6 is an enlarged longitudinal sectional view of the nose end of the conical section of the device, taken substantially upon a plane passing along section line 6—6 on FIG. 3, showing details of the mounting of pivot means therein viewed in a downward direction.

FIG. 7 is a fragmentary enlarged transverse sectional view of the lower portion of the device, taken substantially upon a plane passing along sectional line 7—7 on FIG. 3, showing details of the indicating means for locating the position of the cup during use.

FIG. 8 is an end elevational view, partly in section in the direction of the opening for filling the device, illustrating positions of the cup during rotation.

FIG. 9 is a fragmentary sectional view of the cup assembly of an alternative embodiment of the invention, showing an insert cup for use with eggs of small diameter.

FIG. 10 is a group perspective view of the cup assembly shown in FIG. 9.

DESCRIPTION OF THE PREFERRED EMBODIMENT

The present invention, designated generally by the numeral 20 in FIGS. 1 and 2, is attached to belt 22 of a person engaged in sport fishing by holder 24. Cap 26 covers the nose end of the conical portion of device 20 and sliding door 28 provides access from the upper portion of device 20 for removal of an egg during use. Stopper 30 is removable for filling of device 20 through neck 32 for resupply from a jar or other suitable container in which fish eggs used for bait are sold. Serrations 34 on stopper 30 permit a firm grip for rotation of neck 32 during use.

Referring now to FIG. 3, a supply of fish eggs 36 for use as bait is shown in the lower portion of inside container 38 in the space defined by walls of inside container 38, baffle plate 40, stopper 30 and neck 32. Inside container 38 is supported within outside protective case 42 at grommet seal 44 and bearing surface 46 between bearing segment 86 and shoulder 39 of inside container 38. Opening 48 in inside container 38 is provided for insertion therethrough of cup 50, constructed of a cylindrical shape with an upright recess 52 opening from a side edge. Cup 50 is mounted axially on stem 54, terminating in a fork 56 which forms a portion of universal joint 58. Stem 54 is mounted in bearing surface 60 on inside container 38, and stem 54 is positioned axially through use of spacer 62. Bearing 64, also mounted on inside container 38, retains axial finger 66, which projects axially from cup 50. Egg 68 is shown in recess 52 for removal through opening 70 in outside protective case 42 when sliding door 28 is moved to the open position.

In FIG. 4, sliding door 28 is shown in closed position, and the direction of sliding for opening of door 28 is shown by the arrow, with the open position of door 28 shown in phantom. Door rest 72 provides a stop for the door in its closed position, and knob 74 provides a stop for the door when opened. Grip 75 on door 28 permits manual opening and closing of door 28. Slots 76, which are molded into outside protective case 42, curve conformingly with case 42 to grip the edges of sliding door 28 and conformingly secure door 28 to case 42.

Means for maintaining recess 52 in a upright position during rotation of inside container 38 within case 42 are apparent from FIG. 3, where shaft 80 constitutes the link of universal joint 58 with cover 26. Shaft 80 is held fixed with respect to rotation about its axis through forked end 82 and C-shaped bar 84. As inside container 38 rotates against bearing segment 86, which is held in fixed relationship to outside protective case 42 by suitable fastening means, end 83 of shaft 80 describes a peripheral path of travel without rotation about the axis of shaft 80. Segments 86 and 88 are joined to each other, as well as to cover 26 and outside protective case 42 preferably by cementing, such as with a suitable waterproof glue, such as an epoxy glue. Prongs 90 and 92 of C-shaped bar 84 project into compatible recesses in cover 26, as best seen in FIG. 6. Forked section 82 of shaft 80 engages the central portion 85 of C-shaped bar 84 and is free to rotate within the space formed by bevels 96 on segment 88 and recess 98 formed in cover 26. As inside container 38 is rotated by manual turning of neck 32, cup 50 is carried in a circular path along with shaft 80. However, the fixed position of bar 84 prevents rotation of shaft 80 about its axis, thereby also preventing rotation of stem 54 about its axis and maintaining cup 50 in an upright position as it travels about its circular path. Examples of four positions of cup 50 during rotation of inside container 38 are shown in FIG. 8, where cup 50 is shown in its lowermost position as it receives egg 68 from the supply 36 inside container 38. Shown in phantom are three positions of the case after container 38 has undergone quarter turns, illustrating the continual positioning of recess 52 in an upward direction, thereby holding egg 68 upright at all times.

FIG. 7, shows the indicating means for furnishing awareness to the user of the device when cup 50 is at its highest position for dispensing off egg 68. Leaf spring 100, which is attached by tab 102 to inside container 38, rotates about the periphery of container 38 and applies a force to detent means 104 against the inside surface of outside case 42. Recess 106 shown in FIG. 3 in the inside surface of case 42 is in alignment with knob 104 only when cup 50 is located at its uppermost position for dispensing of egg 68. Accordingly, during manual rotation of neck 32, the user is made aware of such a configuration by touch. It is of particular importance for successful use of the device during nighttime sport fishing to be made aware of the position of cup 50 by the tactile, rather than the visual, sense.

In FIG. 9, showing cup 50' in an alternative embodiment of the device, where sliding door 28 is in the open configuration, cup 50' is provided with insert 110 to adapt the invention for use with egg 68' of somewhat reduced diameter from that of egg 68 shown in FIG. 3. Cup 50' is also shown in FIG. 9 with transverse groove 112 to promote draining of liquid through cup 50' when egg 68' is elevated to the position shown. Assembly of cup 50' and insert 110 is shown in FIG. 10.

In operation, the device is filled with a supply of fish eggs, such as salmon eggs, by removal of stopper 30 and insertion of the eggs through neck 32. Stopper 30 is reinserted into neck 32, and empty cup 50 is rotated to the uppermost position by rotation at neck 32 of inside container 38. If the embodiment having a cup with an insert is used, sliding door 28 is opened for insertion of insert 110 having a size most suitable for the egg supply 68 being used. Sliding door 28 is closed and the device is then mounted on belt 22 of the user. When need for dispensing of a single fish egg arises, the user rotates neck 32 and stopper 30 to cause cup 50 to pass through egg supply 36. This can be done without the necessity to remove the device from the belt. When the indicating means on leaf spring 100 gives the user an indication that cup 50 is in its uppermost position, sliding door 28 can be opened and an egg withdrawn through the opening for immediate use. The sliding door is then closed until need arises for repeating the dispensing process.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A device for individual dispensing of a substantially spherical object comprising a container for storing a plurality of objects, the container being rotatable about a horizontal axis and having an opening for receiving therethrough holding means for selecting and lifting from said plurality of substantially spherical objects, one of said objects for removal through said opening, wherein said holding means includes a recess for holding said one object, said holding means being mounted inside said container by mounting means for travel in a circular path centered on said axis, said mounting means maintaining said recess in an upward direction during said travel.

2. The device of claim 1 wherein said container is encased within outside protective means within which the container rotates and said device includes indicating means for indicating through use of tactile sense the dispensing position of said holding means adjacent said opening.

3. A device for individual dispensing of a substantially spherical fragile object comprising a container for storing a plurality of stored objects, the container being rotatable about a horizontal axis and having an opening for receiving therethrough holding means for selecting and lifting from said plurality of substantially spherical objects said object for removal through said opening, wherein said objects are fish eggs and the eggs are stored in contact with a liquid medium, wherein said holding means comprises a cup having a recess for holding said fish egg, the cup being mounted inside said container by mounting means for travel in a circular path centered on said axis, said mounting means maintaining said recess in an upward direction during said travel.

4. The device of claim 3 wherein said cup is cylindrical with projecting axial bearing surfaces, said mounting means comprising compatibly fitting bearings attached to said container, one of said axial bearing surfaces comprising a stem having a forked end remote from said cup, said forked end having connecting means to form a universal joint with a shaft having retaining means at the end of the shaft remote from said universal joint for permitting pivotal motion of said shaft during circular travel of said cup, while preventing rotation of said shaft about its axis.

5. The device of claim 4 wherein said container is encased within outside protective means within which the container rotates, said retaining means being anchored to said outside protective means.

6. The device of claim 5 wherein said outside protective means comprises an outside protective case surrounding said inside container, a bearing segment affixed to said case, and a cover affixed to said bearing segment and anchoring said retaining means.

7. The device of claim 6 wherein said retaining means comprises a C-shaped bar having anchored prongs and a central portion between said prongs slidingly engaged in the groove of a fork formed in the end of said shaft remote from said universal joint.

8. The device of claim 7 wherein said container is separated by a unitary baffle plate into a region for storing said fish eggs and a region containing said universal joint and said shaft, said outside protective case having opening means for removing said fish egg from said cup.

9. The device of claim 8 wherein said protective case has adaptor means for fastening to the belt of a user.

10. The device of claim 9 together with indicating means for indicating through use of tactile sense a dispensing position of said cup.

11. The device of claim 10 wherein said indicating means comprises a leaf spring mounted to said container, said leaf spring having detent means to engage a recess in said outside protective case.

12. The device of claim 11 wherein said container has a filling neck for supplying said fish eggs and for rotation of said container within said outside protective case, said neck being supported by a grommet seal on an opening through said outside protective case, said neck having a stopper for facilitating said rotation and for airtight sealing of said fish eggs within said container.

* * * * *